United States Patent [19]
Klinger et al.

[11] Patent Number: 5,858,519
[45] Date of Patent: *Jan. 12, 1999

[54] ABSORBING ANTI-REFLECTION COATINGS FOR COMPUTER DISPLAYS

[75] Inventors: Robert E. Klinger, Rohnert Park; Scott E. Solberg, Santa Rosa, both of Calif.

[73] Assignee: Optical Coating Laboratory, Inc., Santa Rosa, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 378,585

[22] Filed: Jan. 27, 1995

[51] Int. Cl.$^6$ .............................. C03C 17/34; G02B 5/28
[52] U.S. Cl. ......................... 428/212; 359/359; 359/585; 359/589; 428/426; 428/432; 428/457; 428/469; 428/472; 428/701; 428/702; 428/446
[58] Field of Search ..................................... 428/212, 426, 428/432, 457, 469, 472, 701, 702, 446; 359/359, 585, 589

[56] References Cited

U.S. PATENT DOCUMENTS

| | | | |
|---|---|---|---|
| 3,649,359 | 3/1972 | Apfel et al. | 117/33.3 |
| 4,122,239 | 10/1978 | Riboulet et al. | 350/1.7 |
| 4,341,841 | 7/1982 | Ohno et al. | 428/446 |
| 4,413,877 | 11/1983 | Suzuki et al. | 350/1.7 |
| 4,786,783 | 11/1988 | Woodard | 219/547 |
| 4,960,310 | 10/1990 | Cushing | 350/1.7 |
| 4,973,511 | 11/1990 | Farmer et al. | 428/457 |
| 5,091,244 | 2/1992 | Biornard | 428/216 |
| 5,140,457 | 8/1992 | Letter | 359/359 |
| 5,168,003 | 12/1992 | Proscra | 428/701 |
| 5,216,542 | 6/1993 | Szczyrbowski et al. | 359/588 |
| 5,521,765 | 5/1996 | Wolfe | 359/585 |

FOREIGN PATENT DOCUMENTS 41 17 257 A1   12/1992   Germany .

*Primary Examiner*—Archene Turner
*Attorney, Agent, or Firm*—Workman, Nydegger & Seeley

[57] ABSTRACT

An absorbing anti-reflection coating which can be applied directly to the faceplate of a video display such as a cathode ray tube or a plasma display by physical or chemical vapor deposition comprises at least 3 materials: L, a low retractive index material such as the metal oxide $SiO_2$; H, a high refractive index material such as the metal oxide $Nb_2O_5$; and M, a metal or metallic alloy or metallic compound layer with a refractive index greater than 0.5 and extinction coefficient less than 5. Preferably the materials are used in the design MHLHL or HMHL. The design and materials provide broadband performance with a low layer count. The single metal layer design permits relatively low values of sheet resistance (high conductivity). Transmittance values are high, typically 70%±5%. Reflectance typically is ≦0.6%.

20 Claims, 4 Drawing Sheets

ABSORBING ANTI-REFLECTION COATINGS FOR COMPUTER DISPLAYS

I. BACKGROUND OF THE INVENTION

A. Field of the Invention

The present invention relates to absorbing, anti-reflection (AR) coatings.

B. Description of the Related Technology

Conventional absorbing anti-reflection coatings (absorbing ARs) comprise multiple pairs of thin metal underlayers and approximately quarter-wave thick low index dielectric overcoats. The coating terminates in a low index dielectric layer. This design approach is described in Joseph H. Apfel, "Graphics in Optical Coating Design," Applied Optics, Vol. 11, p. 1303, 1972.

Using the above design philosophy, one can optimize for minimum reflection, ignoring transmission. The result is a so-called "dark mirror". Typical applications of dark mirrors include the internal baffling of telescopes and other high gain optical systems. Alternately, one can compromise between intermediate levels of transmission and slightly higher reflection. This ability to select transmission and reflection has led to the perhaps overly simplistic description of absorbing AR's as being "tunable."

The assignee, Optical Coating Laboratory, Inc. has marketed a two period absorbing AR coating deposited on PET for use in GlareGuard® contrast enhancement filters. This absorbing AR product used a four layer nickel/magnesium fluoride design: $Ni/MgF_2/Ni/MgF_2$. A theoretical plot of this design is depicted in FIG. 1, for comparison to the performance of product embodying the present invention. This prior product is characterized by conductivity (sheet resistivity) of about 2000 Ω/□, coating transmission ≦60%, and reflection ≦0.25%. The nickel/fluoride coating can not be sputtered successfully.

A central point of the Apfel teaching, and of subsequent designs, is that coatings employing absorbing (metallic) materials can provide low reflectance performance over a broad band by employing multiple periods of metal/dielectric layers. In general, absorbing AR coatings for display applications have been limited to one or two periods, apparently in an attempt to balance the requirement of low reflection against the competing requirement of high transmission, which requires minimizing the metal content of the coating. For many applications, establishing this balance with 40%–60% transmission is adequate. It seems impossible to construct the repeating period structure with metal films which are thin enough to produce higher transmission.

However, some contrast enhancement applications do require a higher level of transmission, such as 70%. Such a high level of transmission applies where it is necessary or desirable to match as closely as possible the optical performance of current optical system designs which use an all dielectric anti-reflection coating applied to absorbing glass. For example, replacing the 70% transmitting bonded safety panel on a CRT with a coating directly deposited onto the CRT faceplate may require that the coating likewise exhibit 70% transmission.

To achieve such a high level of transmission performance, it is necessary to decrease the thickness of the metal to the extent that other limiting factors become operative (dominant). For example, as films get progressively thinner, they begin to lose their electrical conductivity, either through anomalous skin effects or because they are so thin as to be discontinuous, that is, they do not form a continuous film.

II. SUMMARY OF THE INVENTION

The present invention provides a means of reducing the reflection from the face of video displays such as CRTs and improving contrast by increasing the absorption of light reflected and scattered off features such as internal phosphors or interfaces of the display. In one aspect, the present invention is embodied in an absorbing anti-reflection coating which can be formed directly on a substrate such as the face of a video display by physical or chemical deposition. Preferably, the coating design is selected from substrate/MHLHL/air or aubstrate/HMHL/air, where L is a material such as a metal oxide having a relatively low index of refraction, H is a material such as a metal oxide having a relatively high index of refraction, and M is an optically absorbing material such as a metal or metal alloy or metallic compound layer.

In a presently preferred embodiment for video displays, L is a low refractive index metal oxide for which n at 550 nm is less than about 1.70; H is a high refractive index metal oxide for which n at 550 nm is greater than about 1.90; and the metal layer M is selected from metal or metal alloy or metallic compound material having a refractive index greater than about 0.5 and an extinction coefficient less than approximately 5.

In yet another aspect, the present invention is embodied in a composite of the type described above, wherein L is selected from organic polymers, $SiO_x$, including $SiO_2$, and $Al_2O_3$; H is selected from $Nb_2O_5$, $TiO_2$, $ZrO_2$, $In_2O_3$, $SnO_2$ and alloys of said materials; and M is selected from gray metals and alloys including nickel chromium iron alloy, titanium, iron, chromium, nickel, niobium and cobalt, nitrides of titanium, iron, chromium, niobium and cobalt, and alloys of the stated metals and metal compounds. Suitable organic polymers include plasma polymerized organosilanes, spin-coated silicones and spin-coated fluoropolymers.

III. BRIEF DESCRIPTION OF THE DRAWING

The present invention is described below with reference to the drawing, in which.

IV. DETAILED DESCRIPTION OF THE PREFERRED EMBODIMENT(S)

A. Design and Materials

Figure 1:
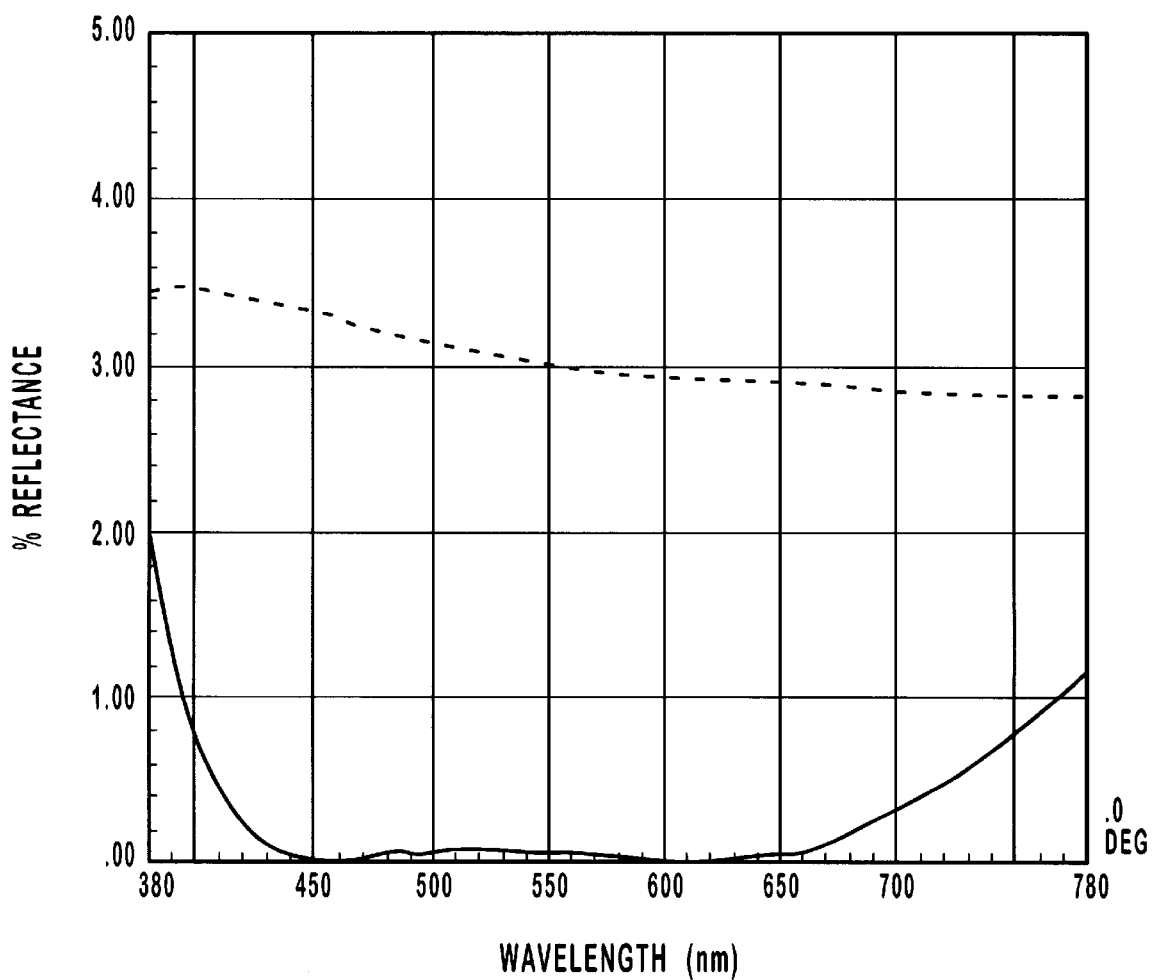
FIG. 1 depicts a theoretical plot of a prior art two period, four layer ($Ni/MgF_2/Ni/MgF_2$), absorbing AR coating deposited on PET and available from the assignee for mounting on contrast enhancement filters.
Figure 2:
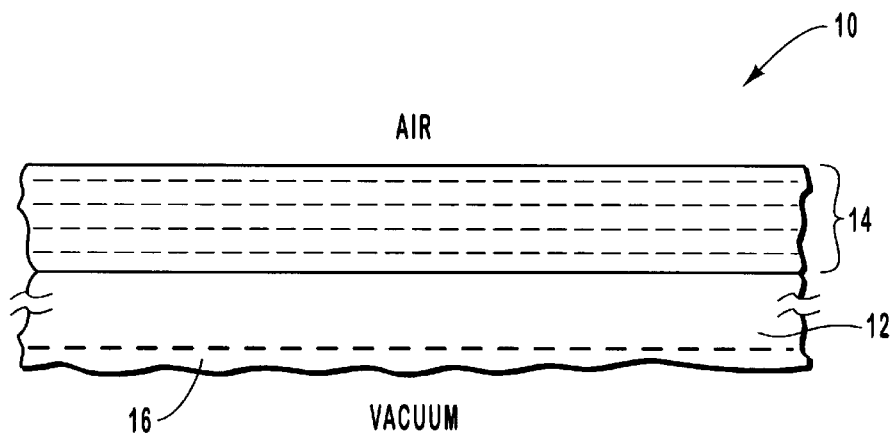
FIG. 2 is a simplified schematic depiction of a cross-section of a preferred absorbing, anti-reflection composite in accordance with the present invention.

FIG. 2 depicts a preferred embodiment of a composite 10 comprising an absorbing anti-reflection coating 14 in accordance with the present invention, formed on a substrate 12 such as the glass faceplate or panel of a video display such as CRT or plasma display by techniques such as physical or chemical vapor deposition. To assist in understanding the orientation of CRTs and the like, the figure also includes reference to the ambient air and to the vacuum enclosure of the CRT. The figure also depicts the optional use of phosphor elements 16, for example on the inner side of a CRT faceplate. The absorbing anti-reflection coating 14 comprises at least 4 layers selected from the three materials L, H, and M, where L is a material having a relatively low index of refraction, H is a material having a relatively high index of refraction, and M is a metal or metal alloy or metallic compound layer. For convenience, we simply term M a "metal layer."

Preferably, L is a metal oxide such as $SiO_2$ which has a refractive index $\leq 1.60$ at about 550 nm; H is a metal oxide such as $Nb_2O_5$ which has a refractive index $\geq 2.2$ at about 550 nm; and the metal layer M has a refractive index greater than about 0.5 and an extinction coefficient less than about 5. Using these materials and the design MHLHL or HMHL provides reflectance $\leq 0.5\%$ at 550 nm. Furthermore, the selection of M can be used to vary the transmission of the coating between 55% and 80% and to provide a coating resistivity which is less than 1000 ohms per square, preferably less than 500 ohms/sq.

The above-described design embodying the present invention uses a fundamentally different approach for achieving broadband reflection performance. Instead of multiple periods of metal/dielectric pairs, a single metal layer is used, which is part of an otherwise dielectric anti-reflection (AR) structure. Because only a single metal layer is employed, it can be and is sufficiently thick so that its "bulk" metallic optical and electric properties are in large part retained.

Furthermore, the above design reduces the reflection from the surface of substrates such as CRTs or other displays and also improves contrast by increasing the absorption of light which is reflected and scattered off features such as internal phosphors or interfaces in the display. The use of metals provides a unique combination of advantages, including 1) process simplicity, 2) conductive coating, and 3) ease of coating removal for rework. The need for coating rework is critical for high value substrates such as displays, which must be salvaged if the coating is defective. If the first layer is metal, wet chemical etching can be used to remove the coating. For other first layer materials, mechanical polishing will readily remove the coating.

Figure 3:
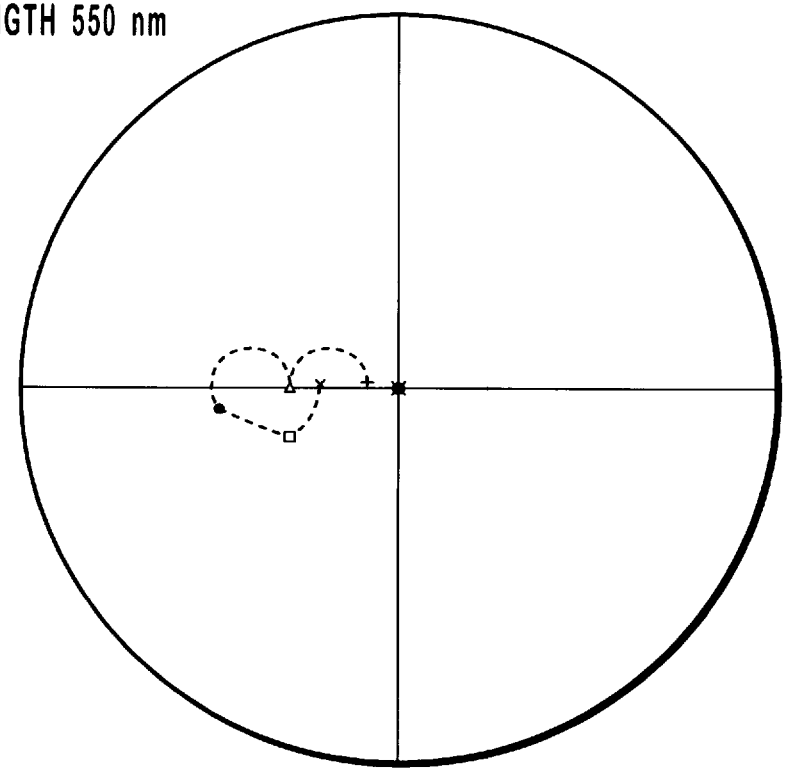
FIG. 3 depicts a reflectance vector amplitude plot, commonly referred to as a circle diagram, for an absorbing, anti-reflection coating in accordance with the present invention.

For purposes of illustration, consider the exemplary substrate\HMHL\air design and the associated circle diagram of FIG. 3. Employing the terminology of the circle diagram, the anti-reflection coating 12 is formed on the substrate by first forming the high index dielectric film to a thickness of less than a visual quarterwave, but substantially thicker than the layers described for example in the Szczyrbowski Offenlegungschrifft. Choices for the low index material include organic polymers, $SiO_x$, including $SiO_2$, and $Al_2O_3$. The metal layer, which is formed next, on the first high index film, preferably is a so-called "gray" metal or alloy thereof. Suitable choices include nickel chromium iron alloy, titanium, iron, chromium, nickel, niobium and cobalt and nitrides of titanium, iron, chromium, niobium and cobalt, and alloys of these metals and metal compounds. Typical metal layer thickness is 6–8 nm. On the circle diagram, this metal layer provides a reflectance amplitude proximate the negative real axis with a magnitude of about 0.5. Because of the relative insensitiviity of the amplitude reflectance of the metal layer to changes in wavelength, this location is relatively constant across a reasonably broad band such as the visual spectrum. (From an optical standpoint, this dielectric/metal substructure behaves like a high index dielectric.) The antireflection coating is completed by forming the outer high index and low index dielectric layers on the existing structure. The low index material may be $Nb_2O_5$, $TiO_2$, $ZrO_2$, $In_2O_3$, $SnO_2$ and alloys of said materials. The thickness of each of these two outer layers is essentially a visual quarter-wave optical thickness QWOT). The two layers effectively function as a two layer, step-down anti-reflection coating.

B. Example(s)

Figure 4:
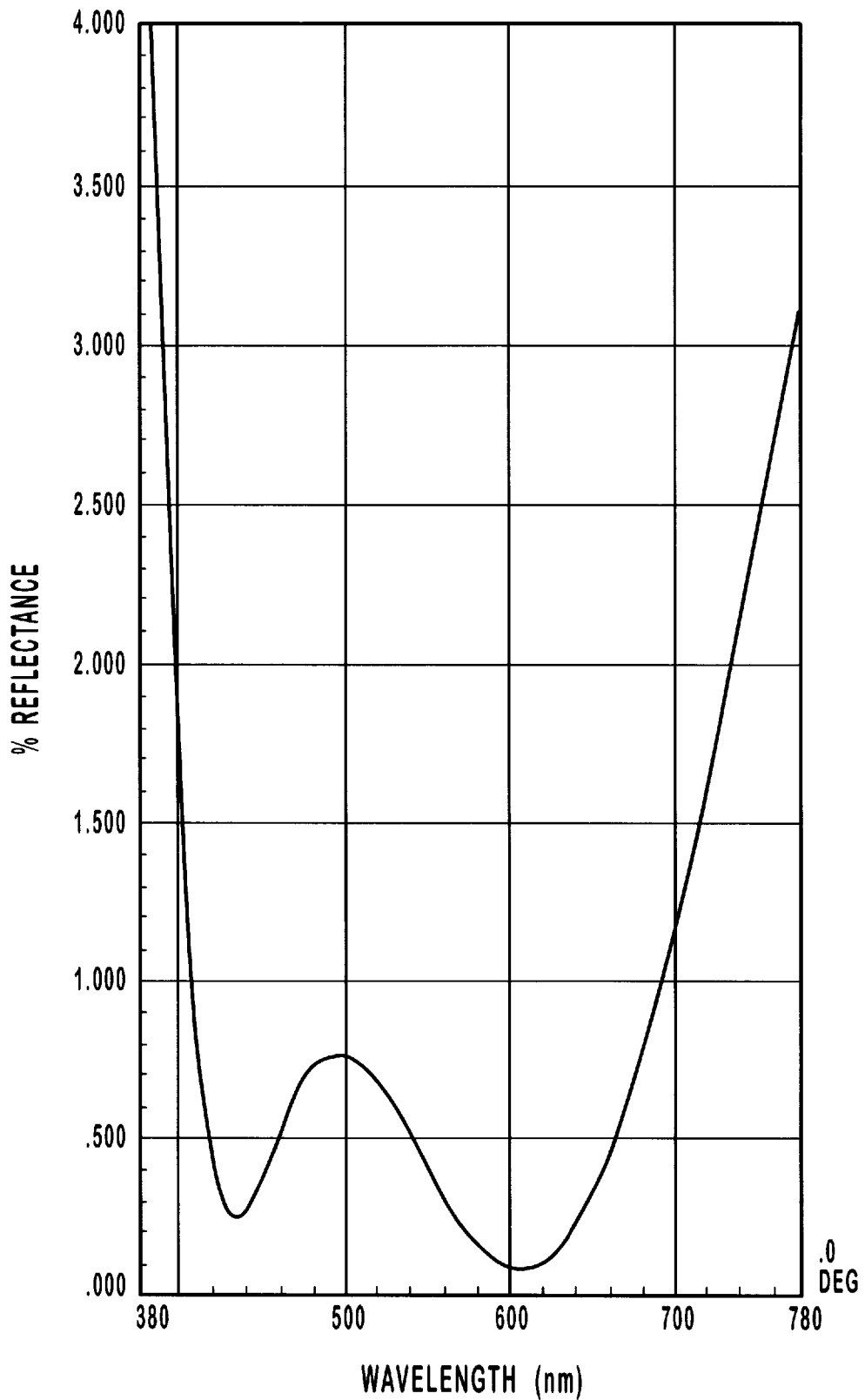
FIG. 4 depicts the theoretical reflectance of an absorbing, AR coating embodying the present invention, specifically the design: substrate\\$Nb_2O_5$, 19 nm\\Inconel, 6 nm\\$Nb_2O_5$, 64 nm\\$SiO_2$, 88 nm\\air.
Figure 5:
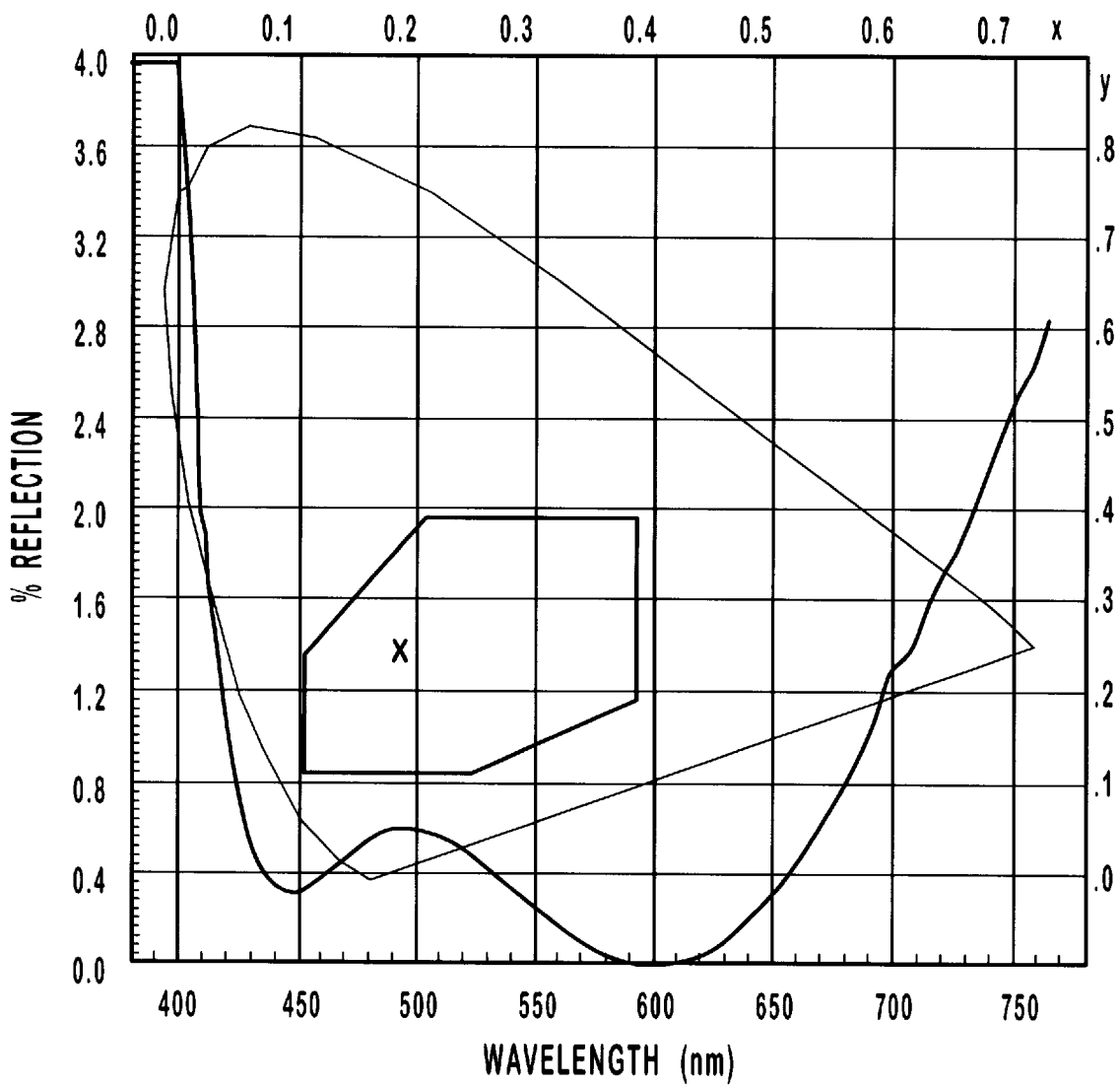
FIG. 5 depicts the measured reflectance of an absorbing, anti-reflection coating for which the theoretical reflectance is given in FIG. 4.

An exemplary design in accordance with the present invention (substrate\HMHL\air) is: substrate\$Nb_2O_5$, 19 nm\Inconel, 6 nm\$Nb_2O_5$, 64 nm\$SiO_2$, 88 nm\air, where nm refers to nanometer(s). The theoretical reflectance of this anti-reflection coating is shown in FIG. 4; the measured reflectance is shown in FIG. 5.

TABLE 1 below lists optical properties used to generate the theoretical reflectance of the exemplary substrate\HMHL\air design.

C. Summary of Certain Advantages

The design features and associated functions/benefits of the novel design according to the present invention include the following. First, broadband performance is achieved with a low layer count. The low layer count (4 or 5 layers) lowers costs, provides ease of process control, and facilitates use of a continuous, in-line process. Second, the single metal layer design permits relatively low values of sheet resistance (high conductivity), which permit better shielding of devices such as CRTs. Third, transmittance values are high, typically 70%±5%, and higher than can be achieved using other broadband absorbing designs. The high transmittance provides an optimum compromise between display contrast and brightness. Finally, but not exhaustively, the low reflectance, $\leq 0.6\%$, enhances contrast and increases the visual signal-to-noise ratio of the associated display or monitor.

TABLE 1

| WVL | N | K |
|---|---|---|
| DISPERSION OF $SiO_2$ | | |
| 375.000 | 1.490 | |
| 468.750 | 1.484 | |
| 562.500 | 1.480 | |
| 656.250 | 1.478 | |
| 750.000 | 1.476 | |
| DISPERSION OF $Nb_2O_5$ | | |
| 375.000 | 2.850 | 0.022 |
| 468.750 | 2.533 | 0.001 |
| 562.500 | 2.436 | 0.906000E-03 |
| 656.250 | 2.388 | 0.787500E-03 |
| 750.000 | 2.358 | 0.790009E-03 |
| DISPERSION OF Inconel | | |
| 380. | 1.652 | 2.289 |
| 480. | 2.148 | 2.296 |
| 580. | 2.524 | 2.485 |
| 680. | 2.815 | 2.688 |
| 780. | 3.064 | 2.872 |

Those of usual skill in the art will readily apply the description here to devise additional modifications embodiments of the invention which are within and are limited only by the scope of the appended claims.

What is claimed is:

1. An absorbing, anti-reflection optical composite, comprising: a substrate; and an absorbing, anti-reflection coating formed on the substrate, the coating having a design selected from the group consisting of substrate/MHLHL and substrate/HMHL, where L is a material having a relatively low index of refraction, H is a material having a relatively high index of refraction, and M is an optically absorbing material selected from the group consisting of metal, metal alloys and metal-containing compounds.

2. The composite of claim 1, wherein L is selected from the group consisting of $SiO_x$ and $Al_2O_3$; H is selected from the group consisting of $Nb_2O_5$, $TiO_2$, $ZrO_2$, $In_2O_3$, $SnO_2$ and alloys thereof; and M is a gray metal or alloy thereof selected from the group consisting of nickel chromium iron alloy, titanium, iron, chromium, nickel, niobium and cobalt, and nitrides of titanium, iron, chromium, niobium and cobalt.

3. The composite of claim 1, wherein L is a metal oxide having an index of refraction $\leq 1.70$ at about 550 nm; H is a metal oxide having an index of refraction $\geq 1.90$ at about 550 nm; and M has a refractive index $\geq 0.5$ and an extinction coefficient $\leq 5$.

4. The composite of claim 3, wherein L is selected from the group consisting of $SiO_x$ and $Al_2O_3$; H is selected from the group consisting of $Nb_2O_5$, $TiO_2$, $ZrO_2$, $In_2O_3$, $SnO_2$ and alloys thereof; and M is a gray metal or alloy thereof selected from the group consisting of nickel chromium iron alloy, titanium, iron, chromium, nickel, niobium and cobalt, and nitrides of titanium, iron, chromium, niobium and cobalt.

5. The composite of claim 1, wherein L is an organic polymer.

6. The composite of claim 1, wherein L is an organic polymer; H is selected from the group consisting of $Nb_2O_5$, $TiO_2$, $ZrO_2$, $In_2O_3$, $SnO_2$ and alloys thereof; and M is a gray metal or alloy thereof selected from the group consisting of nickel chromium iron alloy, titanium, iron, chromium, nickel, niobium and cobalt, and nitrides of titanium, iron, chromium, niobium and cobalt.

7. The composite of claim 6, wherein L is selected from the group consisting of plasma polymerized organosilanes, spin-coated silicones and spin-coated fluoropolymers.

8. The composite of claim 1, wherein the substrate is a faceplate or panel of a video display.

9. An anti-reflection optical composite for a video display, comprising:
   a substrate having an outer surface and being substantially transmissive to visible light;
   a metallic layer on the outer surface of the substrate;
   a first dielectric layer having a relatively high index of refraction on the metallic layer;
   a second dielectric layer having a relatively low index of refraction on the first dielectric layer;
   a third dielectric layer having a relatively high index of refraction on the second dielectric layer; and
   a fourth dielectric layer having a relatively low index of refraction on the third dielectric layer.

10. The composite of claim 9, wherein the substrate is a faceplate or panel of a video display selected from the group consisting of a cathode ray tube and a plasma display.

11. The composite of claim 9, wherein the metallic layer is selected from the group consisting of titanium, iron, chromium, nickel, niobium, cobalt, nickel chromium iron alloy, titanium nitride, iron nitride, chromium nitride, niobium nitride, cobalt nitride, and alloys thereof.

12. The composite of claim 9, wherein the first and third dielectric layers are selected from the group consisting of niobium oxide, titanium dioxide, zirconium oxide, indium oxide, tin oxide, and alloys thereof.

13. The composite of claim 9, wherein the second and fourth dielectric layers are selected from the group consisting of silicon dioxide, aluminum oxide, and mixtures thereof.

14. The composite of claim 9, wherein the second and fourth dielectric layers are organic polymers selected from the group consisting of plasma polymerized organosilanes, spin-coated silicones, spin-coated fluoropolymers, and mixtures thereof.

15. An anti-reflection optical composite for a video display, comprising:
   a substrate having an outer surface and being substantially transmissive to visible light;
   a first dielectric layer having a relatively high index of refraction on the outer surface of the substrate;
   a metallic layer on the first dielectric layer;
   a second dielectric layer having a relatively high index of refraction on the metallic layer; and
   a third dielectric layer having a relatively low index of refraction on the second dielectric layer.

16. The composite of claim 15, wherein the substrate is a faceplate or panel of a video display selected from the group consisting of a cathode ray tube and a plasma display.

17. The composite of claim 15, wherein the metallic layer is selected from the group consisting of titanium, iron, chromium, nickel, niobium, cobalt, nickel chromium iron alloy, titanium nitride, iron nitride, chromium nitride, niobium nitride, cobalt nitride, and alloys thereof.

18. The composite of claim 15, wherein the first and second dielectric layers are selected from the group consisting of niobium oxide, titanium dioxide, zirconium oxide, indium oxide, tin oxide, and alloys thereof.

19. The composite of claim 15, wherein the third dielectric layer is selected from the group consisting of silicon dioxide, aluminum oxide, and mixtures thereof.

20. The composite of claim 15, wherein the third dielectric layer is an organic polymer selected from the group consisting of plasma polymerized organosilanes, spin-coated silicones, spin-coated fluoropolymers, and mixtures thereof.

* * * * *

UNITED STATES PATENT AND TRADEMARK OFFICE
CERTIFICATE OF CORRECTION

PATENT NO. : 5,858,519

DATED : Jan. 12, 1999

INVENTOR(S) : Robert E. Klinger; Scott E. Solberg

It is certified that error appears in the above-indentified patent and that said Letters Patent is hereby corrected as shown below:

Col. 4, line 54, change "0.906000E-03" to --0.900000E-03--

Col. 4, line 56, change "0.790009E-03" to --0.700000E-03--

Signed and Sealed this

Nineteenth Day of October, 1999

Attest:

Q. TODD DICKINSON

*Attesting Officer*        *Acting Commissioner of Patents and Trademarks*